(12) United States Patent
Flemming (10) Patent No.: US 8,779,945 B2
(45) Date of Patent: Jul. 15, 2014

(54) VIRTUAL ICE ACCRETION METER DISPLAY

(75) Inventor: Robert James Flemming, Trumbull, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 500 days.

(21) Appl. No.: 13/047,970

(22) Filed: Mar. 15, 2011

(65) Prior Publication Data

US 2011/0226904 A1 Sep. 22, 2011

Related U.S. Application Data

(60) Provisional application No. 61/314,741, filed on Mar. 17, 2010.

(51) Int. Cl.
*G08B 21/00* (2006.01)

(52) U.S. Cl.
USPC ........... 340/962; 340/580; 340/945; 340/963; 340/969; 244/134 F; 702/2; 702/24; 702/55; 701/7; 701/84

(58) Field of Classification Search
USPC ...... 340/962, 945, 580, 963, 969; 244/134 F; 702/3
See application file for complete search history.

(56) References Cited

U.S. PATENT DOCUMENTS

| | | | |
|---|---|---|---|
| 2,800,647 A | 7/1957 | Baerwald et al. | |
| 3,240,054 A | 3/1966 | Roth | |
| 3,836,846 A | 9/1974 | Overall et al. | |
| 3,940,622 A | 2/1976 | Stallabrass et al. | |
| 4,054,255 A | 10/1977 | Magenheim | |
| 4,060,212 A | 11/1977 | Magenheim | |
| 4,095,456 A | 6/1978 | Edgington | |
| 4,176,524 A | 12/1979 | Kamiyama et al. | |
| 4,275,603 A | 6/1981 | Kalocsay | |
| 4,278,875 A | 7/1981 | Bain | |
| 4,365,131 A | 12/1982 | Hansman, Jr. | |
| 4,398,234 A | 8/1983 | Brick et al. | |
| 4,470,123 A | 9/1984 | Magenheim et al. | |
| 4,603,824 A | 8/1986 | McArdel | |
| 4,615,499 A | 10/1986 | Knowler | |
| 4,649,713 A | 3/1987 | Bezek | |
| 4,741,499 A | 5/1988 | Rudolph et al. | |

(Continued)

FOREIGN PATENT DOCUMENTS

| | | |
|---|---|---|
| EP | 2058228 | 5/2009 |
| GB | 2271190 | 6/1994 |

OTHER PUBLICATIONS

AGARD Advisory Group for Aerospace Research & Development, AGARD Advisory Report 344 "Ice Accretion Simulation", Dec. 1997, AGARD, ISBN 92-836-1067-9, pp. 2-1 to 2-14.*

(Continued)

*Primary Examiner* — Mohammad Ghayour
*Assistant Examiner* — Adnan Aziz
(74) *Attorney, Agent, or Firm* — Carlson, Gaskey & Olds, P.C.

(57) ABSTRACT

A flight display for an aircraft includes a virtual ice accretion meter having a liquid water content portion and an ice thickness portion. A method for determining ice accretion includes integrating over a time period a constant K multiplied by a liquid water content (LWC) and true airspeed (TAS).

19 Claims, 7 Drawing Sheets

(56) References Cited

U.S. PATENT DOCUMENTS

| | | | |
|---|---|---|---|
| 4,775,118 A | 10/1988 | Daniels | |
| 4,783,026 A | 11/1988 | Rumford et al. | |
| 4,831,819 A | 5/1989 | Norris et al. | |
| 4,976,397 A | 12/1990 | Rudolph et al. | |
| 5,011,098 A | 4/1991 | McLaren et al. | |
| 5,497,100 A | 3/1996 | Reiser et al. | |
| 5,915,273 A * | 6/1999 | Germanetti | 73/178 H |
| 5,932,806 A | 8/1999 | Rose et al. | |
| 6,270,330 B1 | 8/2001 | Cheng et al. | |
| 6,304,194 B1 * | 10/2001 | McKillip | 340/962 |
| 6,586,705 B1 | 7/2003 | Schell | |
| 6,797,795 B2 | 9/2004 | Byrd | |
| 6,809,169 B2 | 10/2004 | Byrd et al. | |
| 6,923,405 B2 | 8/2005 | Cline et al. | |
| 6,995,572 B2 | 2/2006 | Arndt et al. | |
| 7,157,663 B1 | 1/2007 | Kismarton | |
| 7,202,321 B2 | 4/2007 | Byrd et al. | |
| 7,331,421 B2 | 2/2008 | Olsen et al. | |
| 7,467,031 B2 * | 12/2008 | King | 701/4 |
| 2004/0024538 A1 * | 2/2004 | Severson et al. | 702/24 |
| 2004/0036630 A1 * | 2/2004 | Jamieson et al. | 340/962 |
| 2004/0155151 A1 | 8/2004 | Szilder | |
| 2006/0226292 A1 * | 10/2006 | Houlihan et al. | 244/134 R |
| 2007/0161878 A1 | 7/2007 | Lilie et al. | |
| 2007/0176049 A1 * | 8/2007 | Greene | 244/134 F |
| 2007/0240435 A1 | 10/2007 | Elpern et al. | |
| 2008/0136677 A1 * | 6/2008 | Clark et al. | 340/969 |
| 2008/0167764 A1 | 7/2008 | Flemming | |
| 2008/0218385 A1 | 9/2008 | Cook et al. | |
| 2008/0257033 A1 * | 10/2008 | Roberts | 73/170.26 |
| 2010/0123044 A1 * | 5/2010 | Botura | 244/134 D |
| 2010/0131203 A1 * | 5/2010 | Lilie et al. | 702/3 |

OTHER PUBLICATIONS

Deters et al., "Icing Encounter Flight Simulator", Sep.-Oct. 2006, Journal of Aircraft, vol. 43, No. 5.*

Extended European Search Report, dated Jun. 26, 2011, EP Application No. 11158455.3.

* cited by examiner

VIRTUAL ICE ACCRETION METER DISPLAY

REFERENCE TO RELATED APPLICATIONS

The present application claims the benefit of U.S. Provisional Patent Application No. 61/314,741, filed Mar. 17, 2010.

BACKGROUND

The present disclosure relates to an aircraft flight display, and more particularly to a virtual ice accretion meter display with an ice thickness display portion.

Aircraft may encounter atmospheric conditions that may cause the formation of ice. Accumulated ice, if not removed, may add weight to the aircraft and may alter the aircraft flying characteristics.

Many rotary-wing aircraft and low-speed fixed-wing aircraft utilize an ice accretion device to measure the cumulative effect of flight through an icing cloud. This ice accretion device, frequently referred to as a Visual Accretion Meter (VAM), protrudes from the aircraft fuselage in view of the aircrew. The aircrew visually gage the total effect of an icing environment through indicating marks on the device. The device typically includes an illumination device for night operations and a heater to melt the cumulative ice accretion to reinitiate measurement. Such a VAM installation requires power for lighting and deicing which increases aircraft weight and may negatively effects aerodynamics.

SUMMARY

A flight display for an aircraft according to an exemplary aspect of the present disclosure includes a virtual ice accretion meter having a liquid water content portion and an ice thickness portion.

A method for determining ice accretion on an aircraft component according to an exemplary aspect of the present disclosure includes integrating over a time period a constant K multiplied by a liquid water content (LWC) multiplied by a true airspeed (TAS) and displaying the ice accretion thickness value.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
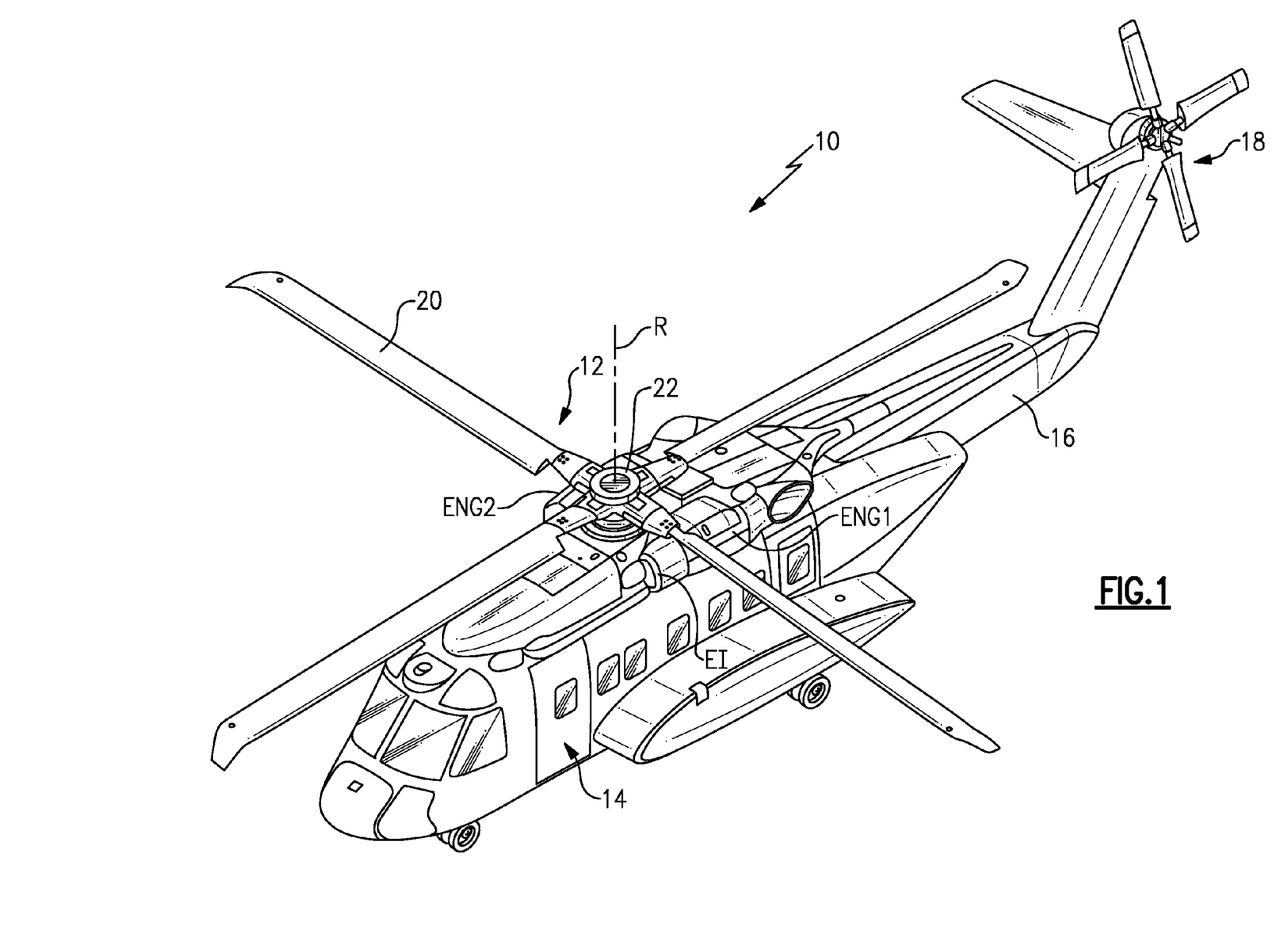
FIG. 1 is a schematic view of a rotary-wing aircraft embodiment for use with the present application.

FIG. 1 schematically illustrates an exemplary vertical take-off and landing (VTOL) rotary-wing aircraft 10. The aircraft 10 in the disclosed, non-limiting embodiment includes a main rotor system 12 supported by an airframe 14 having an extending tail 16 which mounts an antitorque system 18 such as a tail rotor system. The main rotor system 12 is driven about an axis of rotation R through a main gearbox MRG by one or more engines ENG1, ENG2. An engine inlet EI directs air to the engines ENG1 and ENG2. The main rotor system 12 includes a multiple of rotor blades 20 mounted to a rotor hub 22. Although a particular VTOL rotary-wing aircraft configuration is illustrated and described in the exemplary embodiment, other configurations and/or machines, such as high speed compound rotary wing aircraft with supplemental translational thrust systems, dual contra-rotating, coaxial rotor system aircraft, fixed wing aircraft, VTOL aircraft, turbo-props, tilt-rotors and tilt-wing aircraft, will also benefit herefrom.

Figure 2:
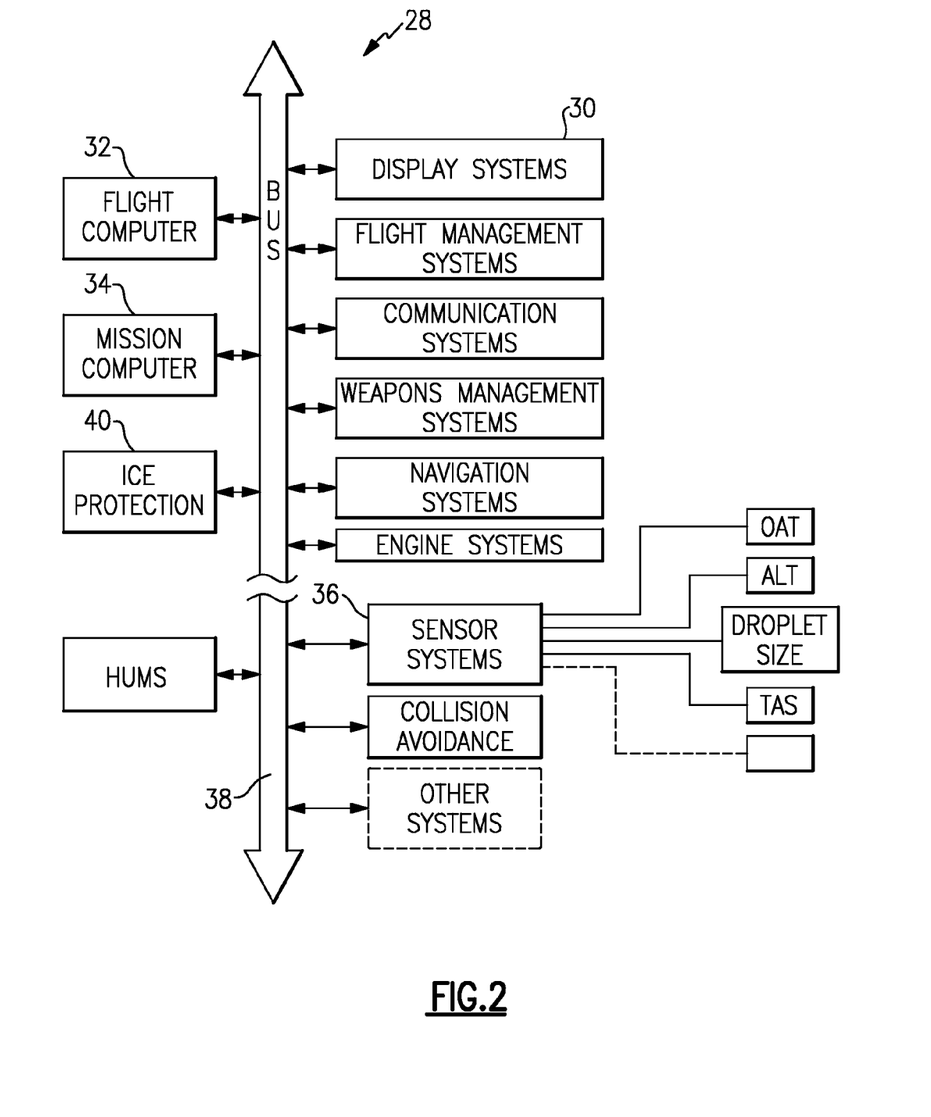
FIG. 2 is a schematic block diagram of an exemplary aircraft avionics system.

Referring to FIG. 2, an aircraft avionics system 28 may include an avionics display system 30 in communication with a flight computer 32, a mission computer 34 and a sensor system 36 over a data bus 38. It should be understood that various other systems and subsystems may be integrated through the data bus 38 within an open architecture design. The avionics display system 30 is operable to control and display information received from other aircraft systems as symbology to interface with an aircrew. The sensor system 36 provides sensor data such as, for example only, airspeed, outside air temperature (OAT), pressure altitude, water drop size, and other such data to the avionics display system 30, the flight computer 32 and the mission computer 34 over the data bus 38.

Although the avionics display system 30 is illustrated as a single block, the display system 30 may include multiple subsystems such as data concentrator units; multifunction displays (MFDs) which display, for example, navigation, flight plans, and system data; primary flight displays (PFDs) which display, for example, critical flight information such as airspeed, altitude, attitude, and bearing; and other systems often as line replaceable units (LRUs). Although the flight computer 32 and mission computer 34 are also each illustrated as an individual block, it should be understood that each may include multiple computers having multiple channels and multiple redundant subsystems. The various systems and subsystems may include, for example, flight control and director systems, weapons systems, air data computers, engine systems, collision and avoidance systems, Health and Usage Management Systems (HUMS) as well as other types of systems currently installed or planned for future aircraft applications typically incorporated as modules in communication with the data bus 38. It should be understood by those skilled in the art with the benefit of this disclosure that although the modules are illustrated as separate blocks, the functions provided thereby may be enacted in dedicated hardware circuitry or programmed software routines capable of execution in any of the systems or subsystems disclosed herein.

Figure 3:
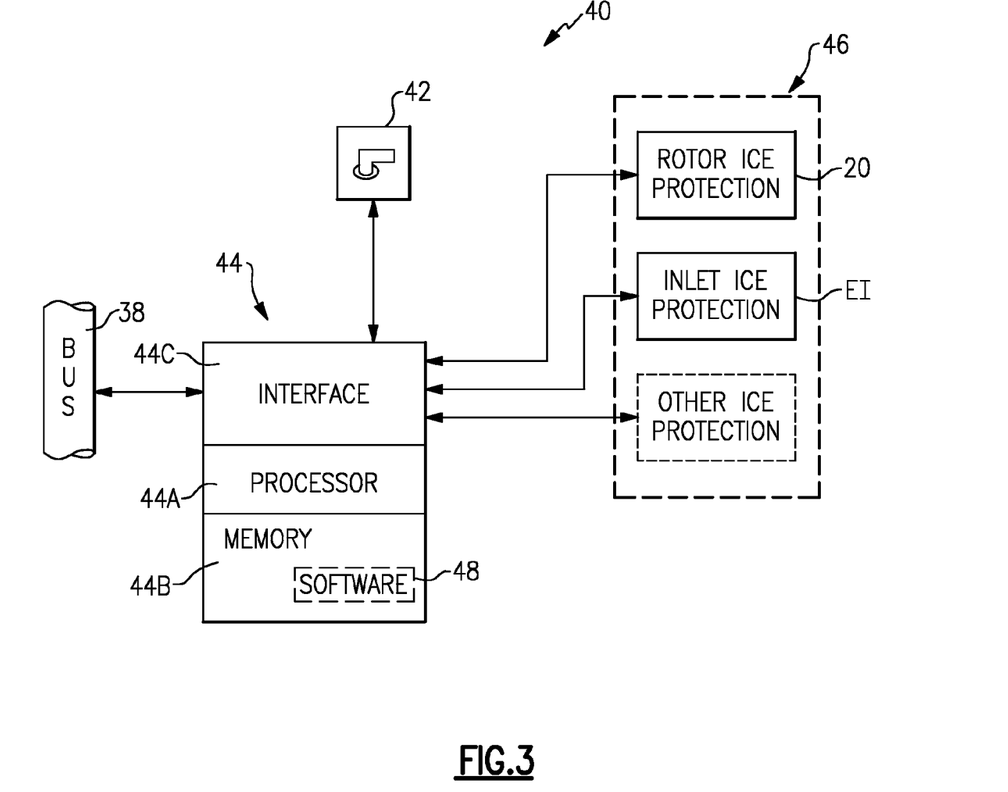
FIG. 3 is a schematic block diagram of a ice protection system.

Referring to FIG. 3, one of the various systems and subsystems includes an ice protection system 40. The ice protection system 40 generally includes a probe 42 such as an ice rate meter probe in communication with a module 44 and a ice protection system 46. The probe 42 provides information for the calculation of instantaneous cloud intensity in terms of liquid water content (LWC). The probe 42 indicates the icing intensity at a given point in time, but does not provide a measure of ice accretion. The module 44 generally includes a processor 44A, a memory 44B, and an interface 44C which facilitates communication with other systems and components through the digital data bus 38. Data from the sensor system 36 is thus available to the module 44 over the data bus 38.

The module 44 communicates over the data bus 38 to operate the ice protection system 46 heating cycle in accords with manual or automatic operation. The ice protection system 46 may include, for example only, a leading edge heater within each rotor blade 20, an engine inlet heater within an engine inlet, and other anti-ice, deice or ice protection systems. The module 44 may store data, software, and control algorithms such as a virtual ice accretion algorithm 48 which is operable to calculate an ice accretion thickness value with parameters available over the data bus 38. The virtual ice accretion algorithm 48 is the scheme by which logic operations are performed and operations are based. By using software to calculate the ice accretion thickness, there is no physical installation, no increase in weight, no unit cost, and no drag increase.

Aircraft certificated to EASA Limited Icing Special Condition require an indication to exit a cloud in an icing environment for an aircraft without a functional rotor icing protection system. This indication has heretofore been provided only by observation of an engine torque gauge and VAM. Moreover, aircraft with unheated (no ice protection) engine inlet leading edges may accrete ice on the engine inlet. During descent into warm air, this ice will shed and the shed ice may potentially damage a downstream component such as the tail rotor system if the accreted ice mass reaches a certain threshold.

Determination of ice accumulation for particular aircraft components is of considerable utility. This determination, effectively a "virtual" ice accretion meter (VIAM), calculates the total ice accretion thickness for a respective aircraft component. Typical applications include, but are not limited to, the measurement of ice accretion on unprotected aircraft components such as an engine inlet where this measure may be used to trigger a warning on the display system 30 to indicate a time to depart an icing environment; a warning that triggers a mandatory inspection or removal should a potential shed ice damage condition be identified; and flight operations in icing conditions with an inoperative ice protection system where the total ice accretion thickness value would again be used to provide the aircrew with a time to depart an icing environment.

Ice accretion is primarily a function of cloud intensity, normally quantified by the liquid water content (LWC); the true airspeed (TAS) of the aircraft through an icing cloud; and the time of passage through the icing cloud. Liquid water content (LWC) data are acquired by the probe 42. The liquid water content (LWC) data may be modified by other data such as sensor data from the sensor system 36 to adjust the acquired data for instrument errors and for the effect of ice sublimation to improve the accuracy of the thickness calculation.

A suitable constant or K factor relates the product of the liquid water content (LWC), the true airspeed (TAS) of the aircraft through an icing cloud, and the time of passage through the icing cloud to the ice accretion for a particular aircraft component associated with that K factor. That is, the K factor is related to the "collection efficiency" of the particular aircraft component. For example, the collection efficiency of an aircraft rotor blade may correlate with a first K factor while an engine inlet will correlate with a second likely different K factor. The K factor may be determined through aircraft test, component modeling or other analytical procedures.

The virtual ice accretion algorithm 48 computes an ice accretion thickness value, T, from liquid water content (LWC) data acquired by the probe 42 and other data from the sensor system 36. The ice accretion thickness value, T, is thereby calculated by the integration over time of the constant K multiplied by liquid water content (LWC) multiplied by the true airspeed (TAS).

Figure 4:
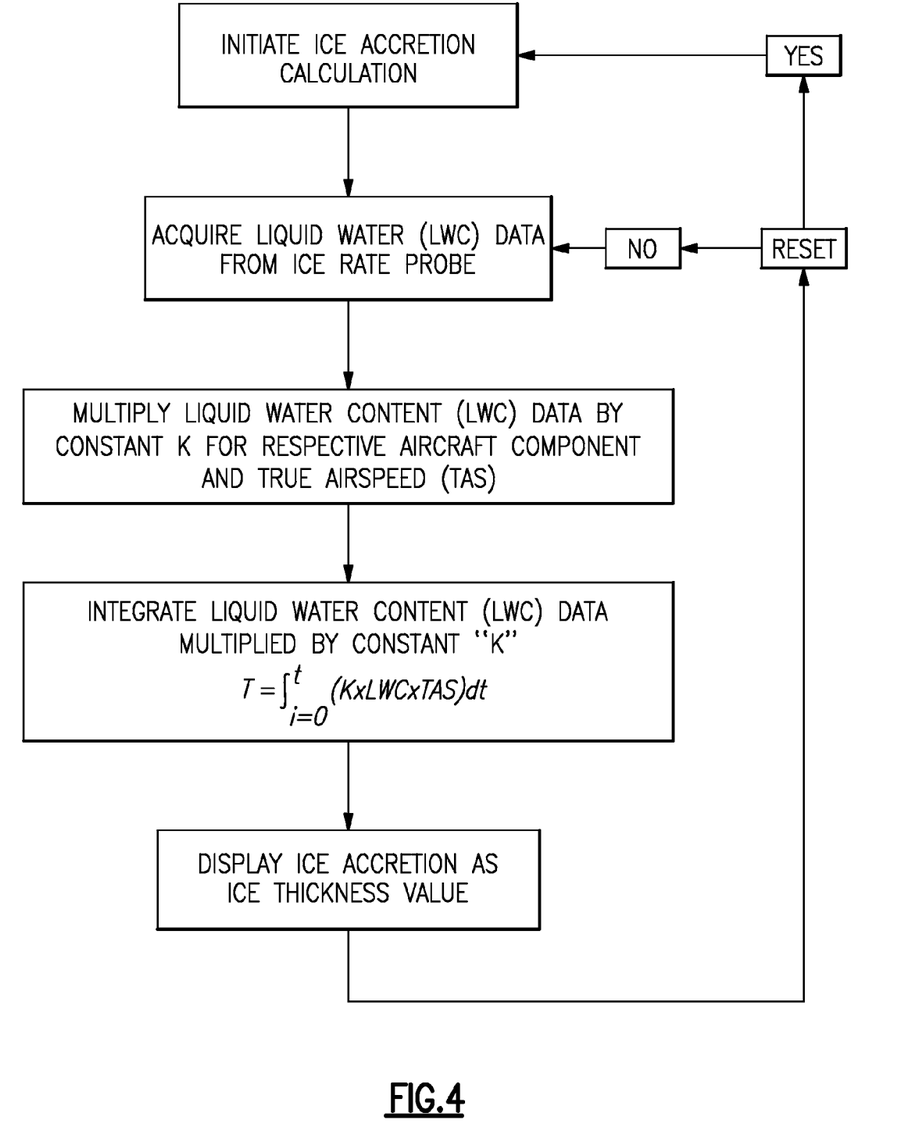
FIG. 4 is a flowchart illustrating operation of the virtual ice accretion algorithm.

The virtual ice accretion algorithm 48 is disclosed in terms of functional block diagrams (FIG. 4), and it should be understood by those skilled in the art with the benefit of this disclosure that the virtual ice accretion algorithm 48 may be enacted in dedicated hardware circuitry or programmed software routines capable of execution in a microprocessor based electronics control embodiment such as the module 44. The ice accretion thickness value, T, is defined mathematically by the formula:

$$T=\int_{t=0}^{t}(K \times LWC \times TAS)dt \quad [1]$$

Initiation of the virtual ice accretion algorithm 48 may begin in response to data from the sensor system 36 which detects that the aircraft has entered an icing cloud or other icing conditions which may form an icing environment. The ice accretion thickness value, T, will thereby generally increase over the time within which the aircraft is subject to the icing condition. It should be understood that various data available from the sensor system 36 may be communicated to the module 44 to trigger initiation of the virtual ice accretion algorithm 48.

Figure 5:
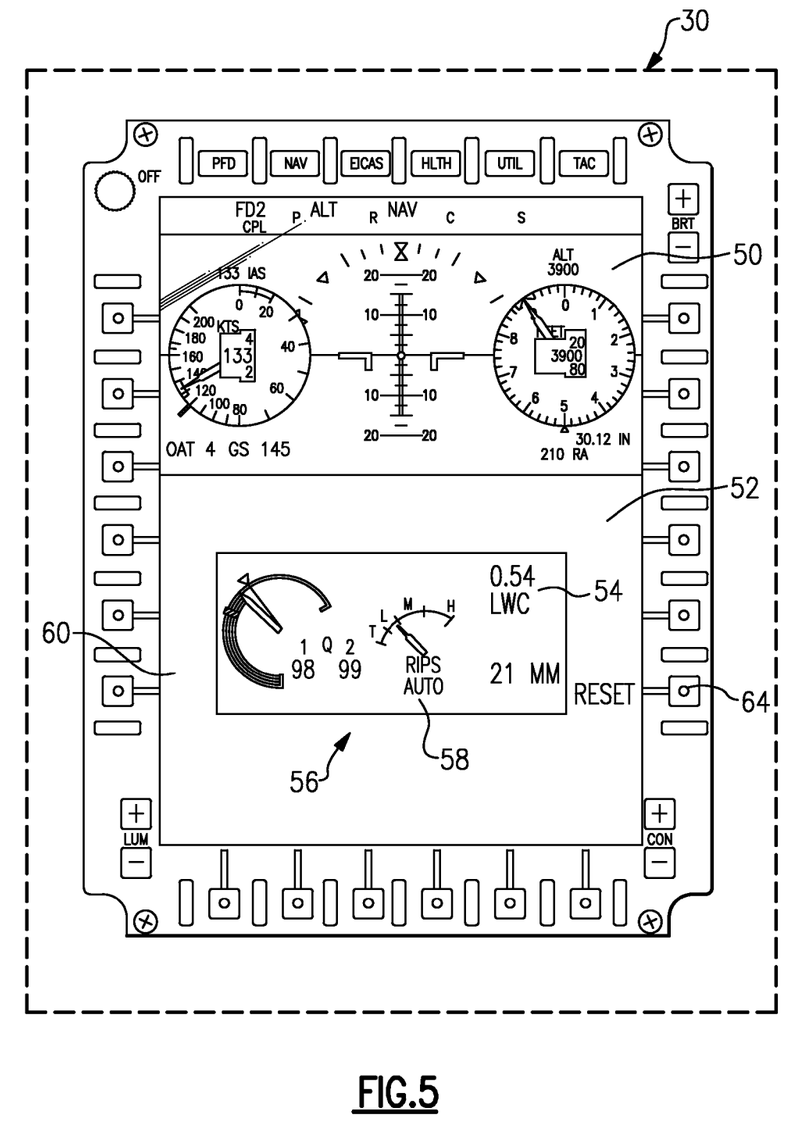
FIG. 5 is view of a PFD page illustrating a virtual ice accretion meter (VIAM) according to one non-limiting embodiment.

Referring to FIG. 5, the ice accretion thickness value, T, may be displayed by the avionics display system 30 on a primary flight display 50 as part of a virtual ice accretion meter (VIAM) display 52. Although illustrated in the non-limiting embodiment as displayed upon a PFD, it should be understood that the present application may be implemented in any number of different electronic systems, display arrangements and display pages without departing from the spirit and scope of this disclosure. The VIAM display 52 provides an indication of the cumulative effects of transit through an icing environment without the need for the hardware involved with a visual accretion meter (VAM).

In one non-limiting embodiment, the VIAM display 52 may include a liquid water content (LWC) portion 54 and an ice thickness portion 56. The LWC portion 54 and the ice thickness portion 56 may be displayed as numeric values which may additionally be color coded such as, for example, yellow numerals for caution and red numerals to signal a time to exit the icing conditions.

The VIAM display 52 may be provided adjacent to an LWC meter display 58 and an engine torque display 60. The LWC meter display 58 may include dial symbology which may display the icing severity as: TRACE, LIGHT, MODERATE and HEAVY (T; L; M; H). It should be understood that the icing severity levels T; L; M; H may be predetermined values. An ICE DETECTED caution (not shown) may additionally be displayed when the ice protection system 46 is off but an icing environment has been detected. The aircrew is thereby notified of the prerequisite to turn on the ice protection system 46.

Figure 6:
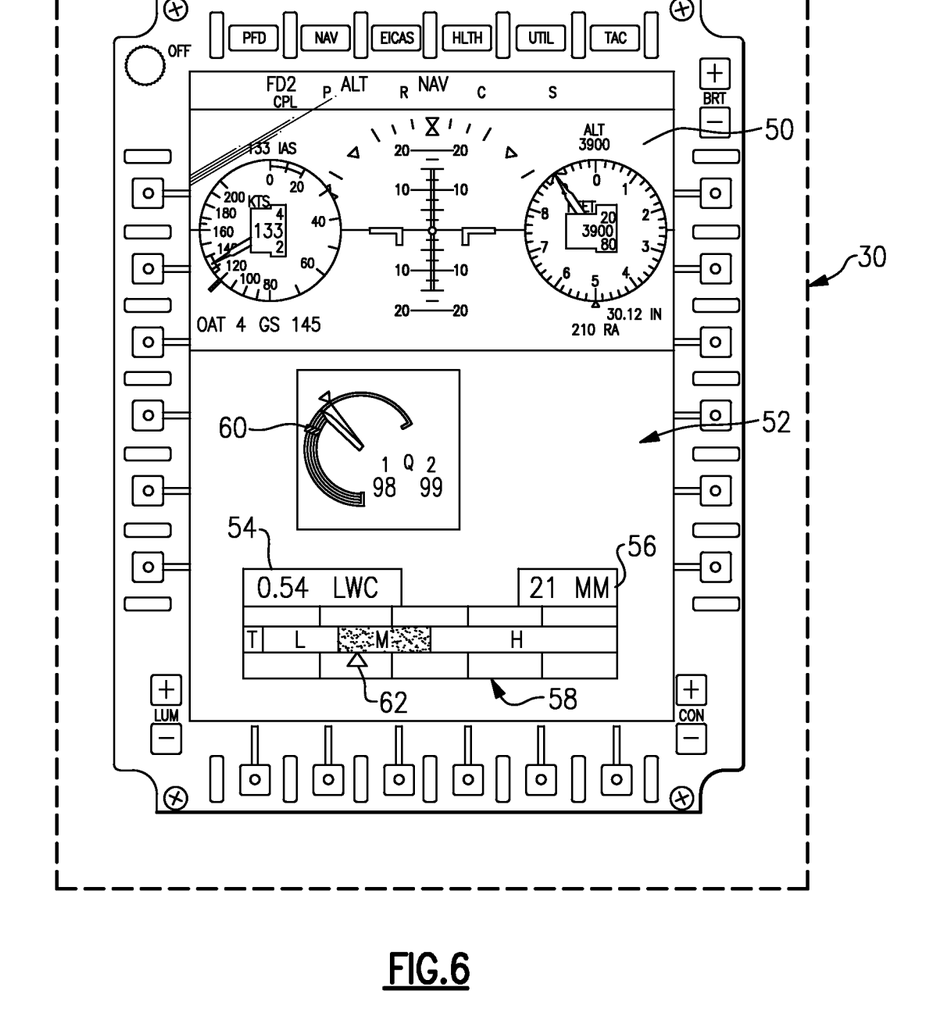
FIG. 6 is view of a PFD page illustrating a virtual ice accretion meter (VIAM) according to another non-limiting embodiment.

Another non-limiting embodiment of the LWC meter display 58 includes tape symbology with a bug 62 which displays the operational heating cycle of the ice protection system 46 with the LWC portion 54 and ice thickness portion 56 adjacent thereto (FIG. 6). It should be understood that various display arrangements and display pages may alternatively be provided.

Figure 7:
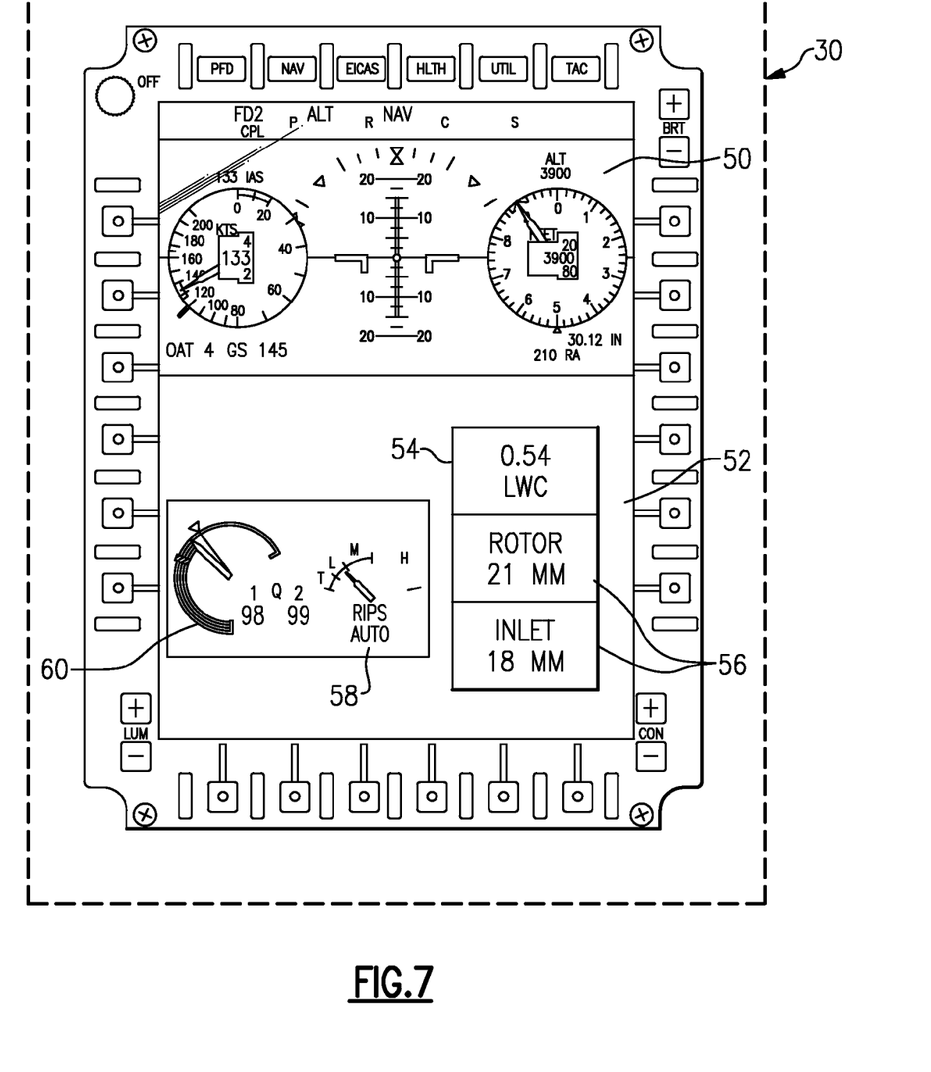
FIG. 7 is view of a PFD page illustrating a virtual ice accretion meter (VIAM) according to another non-limiting embodiment.

In yet another non-limiting embodiment, the ice thickness portion 56 may additionally include numeric values for one or more specific aircraft components such as the main rotor system "ROTOR" and an engine inlet "INLET" which may have different values in response to component specific K values of the respective components (FIG. 7).

The indication of rotor or airframe ice accretion by the VIAM display 52 readily enhances the indication of time available until the required exit from icing conditions. The ice thickness portion 56 of the VIAM display 52 may thereby operate to signal the time for exit from the icing environment. Should the aircraft leave the icing environment and natural deicing occurs, or if a component of interest is deiced through the action of the ice protection system 40, the ice accretion thickness value, T, within the ice thickness portion 56 of the VIAM display 52, may be manually reset through a reset input 64. That is, the ice accretion thickness value, T, is reset to zero.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A flight display for an aircraft, comprising:
    a virtual ice accretion meter display having a liquid water content portion and an ice thickness portion, wherein the ice thickness portion is configured to display an ice thickness value, determined by integrating over a time period a constant K multiplied by a liquid water content (LWC) multiplied by true airspeed (TAS).

2. The flight display as recited in claim 1, further comprising a liquid water content (LWC) meter display adjacent to said virtual ice accretion meter display.

3. The flight display as recited in claim 1, further comprising an engine torque display adjacent to said virtual ice accretion meter display.

4. The flight display as recited in claim 1, wherein said ice thickness portion includes a numeric value which represents ice thickness.

5. The flight display as recited in claim 4, wherein said numeric value is color coded with respect to the ice thickness.

6. The flight display as recited in claim 1, wherein the ice thickness is greater than zero.

7. A method for determining ice accretion on an aircraft component comprising:
    integrating, within an aircraft avionics system, over a time period a constant K multiplied by a liquid water content (LWC) multiplied by true airspeed (TAS) to virtually determine an ice accretion thickness value; and
    displaying, within the aircraft avionics system, the ice accretion thickness value.

8. A method as recited in claim 7, further comprising:
    displaying the ice accretion thickness value as a numeric value which represents an ice thickness on the aircraft component.

9. A method as recited in claim 8, further comprising:
    color coding the numeric value with respect to the ice thickness.

10. A method as recited in claim 7, further comprising:
    determining the constant K for a particular aircraft component.

11. A method as recited in claim 10 wherein the aircraft component is a rotor blade.

12. A method as recited in claim 10 wherein the aircraft component is an engine inlet.

13. A method as recited in claim 7, further comprising:
    resetting the time period.

14. A method as recited in claim 7, wherein the TAS varies over time.

15. A method as recited in claim 7, wherein the LWC varies over time.

16. A method as recited in claim 7, wherein the ice thickness is greater than zero.

17. A method as recited in claim 7, further comprising:
    executing the integrating using a processor within the aircraft avionics system; and
    displaying the ice accretion thickness value on a primary flight display as part of a virtual ice accretion meter display.

18. A method as recited in claim 7, further comprising:
    initiating the integrating in response to data from a sensor system indicating that an aircraft has entered an icing cloud or other icing conditions that may form an icing environment.

19. A flight display for an aircraft, comprising:
    a virtual ice accretion meter display having a liquid water content portion and an ice thickness portion, wherein the ice thickness portion is configured to display an ice thickness value for an area of the aircraft, determined by integrating over a time period a constant K multiplied by a liquid water content (LWC) multiplied by true airspeed (TAS).

* * * * *